US012151503B2

(12) United States Patent
Han et al.

(10) Patent No.: US 12,151,503 B2
(45) Date of Patent: Nov. 26, 2024

(54) MECHANICAL PENCIL

(71) Applicant: WENZHOU TIANJIAO PEN INDUSTRIAL CO., LTD., Wenzhou (CN)

(72) Inventors: Aiguo Han, Wenzhou (CN); Ligeng Guo, Wenzhou (CN)

(73) Assignee: WENZHOU TIANJIAO PEN INDUSTRIAL CO., LTD., Wenzhou (CN)

( * ) Notice: Subject to any disclaimer, the term of this patent is extended or adjusted under 35 U.S.C. 154(b) by 0 days.

(21) Appl. No.: 18/013,257

(22) PCT Filed: Nov. 30, 2021

(86) PCT No.: PCT/CN2021/134378
§ 371 (c)(1),
(2) Date: Dec. 28, 2022

(87) PCT Pub. No.: WO2023/000576
PCT Pub. Date: Jan. 26, 2023

(65) Prior Publication Data

US 2024/0100877 A1 Mar. 28, 2024

(30) Foreign Application Priority Data

Jul. 23, 2021 (CN) ........................ 202110837513.8

(51) Int. Cl.
*B43K 21/16* (2006.01)
*B43K 21/22* (2006.01)

(52) U.S. Cl.
CPC .............. *B43K 21/16* (2013.01); *B43K 21/22* (2013.01)

(58) Field of Classification Search
CPC ................................ B43K 21/16; B43K 21/22
See application file for complete search history.

(56) References Cited

U.S. PATENT DOCUMENTS 7,128,487 B2 * 10/2006 Maruyama ............. B43K 21/16 401/92
11,390,109 B2 * 7/2022 Kageyama ............. B43K 21/16

FOREIGN PATENT DOCUMENTS

| | | | |
|---|---|---|---|
| CN | 101585281 | A | 11/2009 |
| CN | 108136812 | A | 6/2018 |
| CN | 113427930 | A | 9/2021 |
| GB | 191108241 | A | 11/1911 |
| JP | 2006007531 | A | 1/2006 |

* cited by examiner

*Primary Examiner* — Jennifer C Chiang
(74) *Attorney, Agent, or Firm* — Bayramoglu Law Offices LLC

(57) ABSTRACT

A mechanical pencil includes a clamping claw for playing a coordination role in lead output. An abutting member is arranged in front of the clamping claw. The rear end, corresponding to the clamping claw, of the abutting member is provided with an abutting portion. The abutting portion includes a first through hole allowing a lead to move through. The abutting portion can be inserted into the clamping claw in a case where the clamping claw moves forward and simultaneously drives the clamping claw to open outwardly. The mechanical pencil has a better lead output effect.

17 Claims, 4 Drawing Sheets

MECHANICAL PENCIL

CROSS REFERENCE TO THE RELATED APPLICATIONS

This application is the national phase entry of International Application No. PCT/CN2021/134378, filed on Nov. 30, 2021, which is based upon and claims priority to Chinese Patent Application No. 202110837513.8, filed on Jul. 23, 2021, the entire contents of which are incorporated herein by reference.

TECHNICAL FIELD

The present disclosure relates to a mechanical pencil.

BACKGROUND

The existing mechanical pencil generally includes a barrel, an end cover at the front end of the barrel, and a tail cover at the rear end of the barrel. A lead output mechanism in the barrel includes a clamping claw that clamps a lead in a matched manner and a sleeve ring movably sleeved outside the clamping claw in a matched manner. By pressing the tail cover with a hand, the clamping claw and the sleeve ring are driven to move forward while the clamping claw simultaneously clamps the lead to move forward. The sleeve ring is limited to a stop after moving forward for a certain distance, such that the sleeve ring moves backward relative to the clamping claw. The clamping claw is reset by means of its own elasticity and opens to release the lead. When the hand leaves the tail cover, the clamping claw and the sleeve ring move backward under the action of a spring, such that the lead is clamped again, which facilitates the writing. Through the above principle, the tail cover is pressed to make the lead extend out of the front end of the barrel. Thus, the lead can be automatically output.

At present, the existing mechanical pencil has the following shortcomings: For some leads made from special materials, such as colored leads, the materials have a relatively higher viscosity, and these leads generally have larger diameters, resulting in larger contact areas between the leads and the clamping claw of the mechanical pencil. Especially after the clamping claw clamps the lead in a contact manner for a long time, the clamping claw and the lead are likely to stick together. As a result, the lead cannot be normally output. Consequently, an automatic output function of the lead cannot be fulfilled.

SUMMARY

The objective of the present disclosure is to overcome the shortcomings of the prior art by providing a mechanical pencil having a better lead output effect.

To achieve the above objective, the present disclosure provides a mechanical pencil. The mechanical pencil includes a clamping claw for playing a coordination role in lead output; where an abutting member is arranged in front of the clamping claw. The rear end, corresponding to the clamping claw, of the abutting member is provided with an abutting portion. The abutting portion includes a first through hole allowing a lead to move through, and the abutting portion can be inserted into the clamping claw in a case where the clamping claw moves forwards.

The abutting portion can be made of metal and is of a cylindrical structure; the abutting member includes a base portion connected to a barrel or an end cover of the mechanical pencil in a matched manner; the abutting portion is connected and fixed to a rear end of the base portion in a matched manner; and the base portion is made of plastic.

Further, the base portion includes a second through hole coaxially communicating with the first through hole in a matched manner; and an annular mounting groove for insertion and positioning of a front end of the abutting portion is formed in a rear end of the second through hole.

Further, the rear end of the second through hole is provided with a first conical guide surface.

The abutting member may also include a base portion connected to a barrel or an end cover of the mechanical pencil in a matched manner. The abutting portion is integrally connected to the rear end of the base portion, and an outer side of the abutting portion is provided with a second conical guide surface.

The abutting member may be a separate part and is fixedly mounted to an end cover or a barrel of the mechanical pencil.

The abutting member may also be a non-separable part and include the end cover located at the front end of the mechanical pencil. A concave hole is formed in a rear end of the end cover. The abutting member is arranged at an axial center of the concave hole and is of a cylindrical structure. The front end of the abutting member is integrally connected to the end cover. A gap is reserved between the abutting member and a sidewall of the concave hole. The rear end of the abutting member is circumferentially provided with a plurality of slots around the axial center.

The abutting member may be able to move along the mechanical pencil from the front to the back, and a spring is arranged at the front end of the abutting member in a contact manner.

Further, the mechanical pencil includes a limiting part capable of limiting the backward movement of the abutting member, and the limiting part is arranged on the barrel or end cover of the mechanical pencil.

Further, a chamfer is formed on the inner side of the front end of the clamping claw.

The present disclosure has the following beneficial effects: When the tail cover at the rear end of the mechanical pencil is pressed, the clamping claw is driven to move forward. When the clamping claw moves forward, the abutting portion of the abutting member can be inserted into the clamping claw. Bonding portions of the clamping claw and the lead are separated, such that the clamping claw normally opens outwardly. In this way, the clamping claw releases the lead. Compared with a mode in which a clamping claw opens by means of its own elasticity in the prior art, the mode of the present disclosure is not interfered with by the bonding between the lead and the clamping claw and can enhance the lead output effect of the mechanical pencil.

DETAILED DESCRIPTION OF THE EMBODIMENTS

Figure 1:
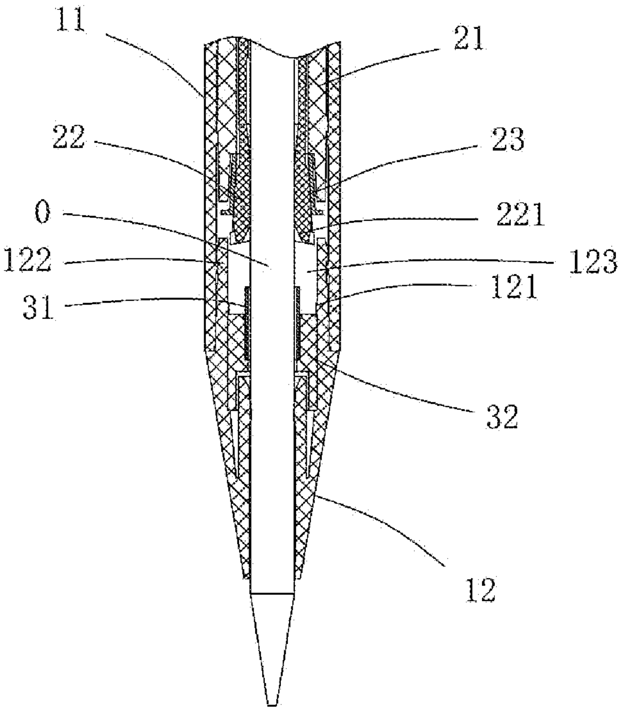
FIG. 1 is a partial view of the structure of a mechanical pencil in embodiment 1 of the present disclosure.
Figure 2:
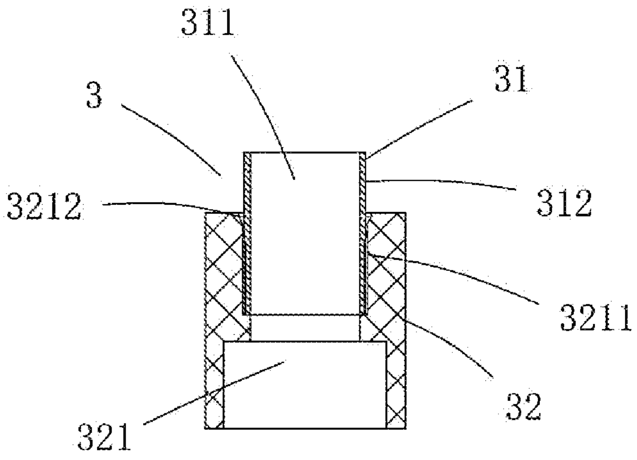
FIG. 2 is a structural view of an abutting member of the mechanical pencil in embodiment 1 of the present disclosure.

As shown in FIG. 1 and FIG. 2, a mechanical pencil of the present disclosure in embodiment 1 includes barrel 11 and end cover 12 at the front end of the barrel 11. A lead output mechanism is arranged between the barrel 11 and the end cover 12. The lead output mechanism includes lead output tube 21, clamping claw 22 clamping lead 0 in a matched manner, and sleeve ring 23 movably sleeved outside the clamping claw 22 in a matched manner, where the clamping claw 22 is telescopically arranged at the front end of the lead output tube 21. A rear end of the end cover 12 includes insertion portion 122 inserted into the barrel 11 and positioned on an inner side of the barrel 11, and concave hole 123 is formed in the rear end of the end cover 12. The insertion portion 122 and the sleeve ring 23 coordinate to fulfill the limitation. By means of relative movement of the clamping claw 22 and the sleeve ring 23, the clamping claw 22 opens and releases the lead 0 when moving forward and clamps the lead 0 again and fixes the lead 0 when moving backward.

Abutting member 3 in front of the clamping claw 22 is arranged between the front end of the barrel 11 and the end cover 12 and located in the mechanical pencil. A rear end of the abutting member 3 that corresponds to the clamping claw 22 is provided with abutting portion 31, and the abutting portion 31 includes first through hole 311 allowing the lead 0 to move through. The abutting portion 31 can be inserted into the clamping claw 22 in a case where the clamping claw 22 moves forward, such that bonding portions of the clamping claw 22 and the lead 0 can be separated, and the clamping claw 22 normally opens by means of its own elasticity.

The abutting portion 31 is made of metal and is of a cylindrical structure. The abutting portion 31 has a uniform and thin peripheral wall 312 and can be inserted between the lead 0 and an inner side of the clamping claw 22 when the clamping claw 22 moves forwards, such that the bonding portions of the clamping claw 22 and the lead 0 are separated, and the clamping claw 22 normally opens by means of its own elasticity. The abutting portion 31 is made of metal that can provide higher strength when matched with the clamping claw 22 and can be made thinner so as to be inserted into the clamping claw 22 more easily without being deformed and damaged. The abutting member 3 includes base portion 32 connected to the end cover 12 in a matched manner. The base portion 32 is inserted into the concave hole 123 from the rear end of the end cover 12 and fixed to the inner side of the concave hole 123. A sidewall of the concave hole 123 is provided with a limiting protrusion 121 which can prevent the base portion 32 inserted into the concave hole 123 from falling out. In this way, the reliability of connection and fixation between the base portion 32 and the end cover 12 can be improved. In other embodiments, the base portion 32 may also be fixedly connected to the barrel 11 in a matched manner.

The abutting portion 31 is fixedly connected to the rear end of the base portion 32 in a matched manner. The base portion 32 is made of plastic. The abutting member 3 is formed by connecting two parts (namely, the abutting portion 31 and the base portion 32) made of different materials and can save on the overall cost based on the premise that the strength of the local position (namely the abutting portion 31) is high. The base portion 32 includes second through hole 321 coaxially communicating with the first through hole 311 in a matched manner. The second through hole 321 also allows the lead 0 to move through. Annular mounting groove 3211 for insertion and positioning of a front end of the abutting portion 31 is formed in the rear end of the second through hole 321. The rear end of the second through hole 321 is provided with first conical guide surface 3212, such that the front end of the abutting portion 31 is inserted into the annular mounting groove 3211 under a guiding effect. The front end of the abutting portion 31 is inserted and fixed into the annular mounting groove 3211 in an interference fit manner, such that the mounting is facilitated.

Chamfer 221 is formed on the inner side of the front end of the clamping claw 22. In this way, the abutting portion 31 can be inserted into the clamping claw 22 under a guiding effect so as to be avoided being stuck.

Figure 3:
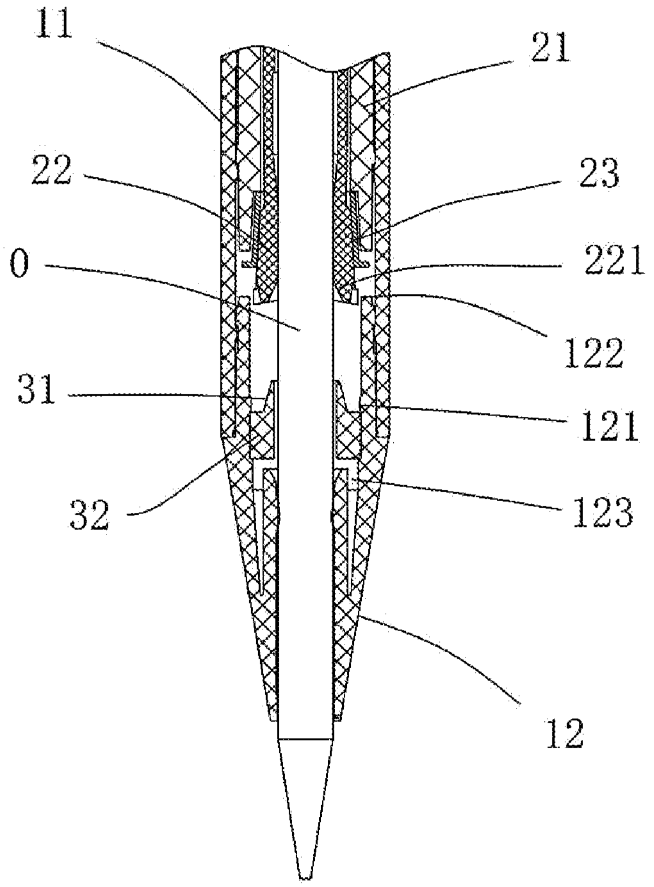
FIG. 3 is a partial view of the structure of a mechanical pencil in embodiment 2 of the present disclosure.
Figure 4:
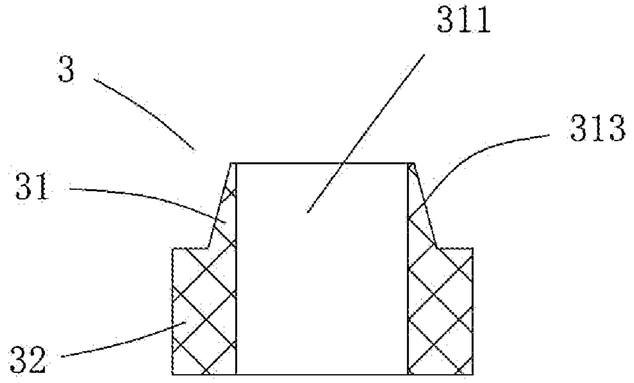
FIG. 4 is a structural view of an abutting member of the mechanical pencil in embodiment 2 of the present disclosure.

As shown in FIG. 3 and FIG. 4, a mechanical pencil of the present disclosure in embodiment 2 includes barrel 11 and end cover 12 at the front end of the barrel 11. A lead output mechanism is arranged between the barrel 11 and the end cover 12. The lead output mechanism includes lead output tube 21, clamping claw 22 clamping lead 0 in a matched manner, and sleeve ring 23 movably sleeved outside the clamping claw 22 in a matched manner, where the clamping claw 22 is telescopically arranged at the front end of the lead output tube 21. The rear end of the end cover 12 includes insertion portion 122 inserted into the barrel 11 and positioned on the inner side of the barrel 11. Concave hole 123 is formed in the rear end of the end cover 12. The insertion portion 122 and the sleeve ring 23 coordinate to fulfill the limitation. By means of relative movement of the clamping claw 22 and the sleeve ring 23, the clamping claw 22 opens and releases the lead 0 when moving forward and clamps the lead 0 again and fixes the lead 0 when moving backward.

Abutting member 3 in front of the clamping claw 22 is arranged between the front end of the barrel 11 and the end cover 12 and located in the mechanical pencil. The rear end of the abutting member 3 that corresponds to the clamping claw 22 is provided with abutting portion 31, and the abutting portion 31 includes first through hole 311 allowing the lead 0 to move through. The abutting portion 31 can be inserted into the clamping claw 22 in a case where the clamping claw 22 moves forward, such that bonding portions of the clamping claw 22 and the lead 0 can be separated, and the clamping claw 22 normally opens by means of own elasticity.

The abutting member 3 includes base portion 32 connected to the end cover 12 of the mechanical pencil in a matched manner. The base portion 32 and the abutting portion 31 at the rear end of the base portion 32 are integrally formed. An outer side of the abutting portion 31 is provided with a second conical guide surface 313, and an outer diameter of the second conical guide surface 313 is gradually increased from back to front. The base portion 32 is inserted into the concave hole 123 from the rear end of the end cover 12 and fixed to the inner side of the concave hole 123. The sidewall of the concave hole 123 is provided with limiting protrusion 121 which can prevent the base portion 32 inserted into the concave hole 123 from falling out. In this way, the reliability of the connection and fixation between the base portion 32 and the end cover 12 can be improved. In other embodiments, the base portion 32 may also be fixedly connected to the barrel 11 in a matched manner.

In embodiment 2, the abutting portion 31 and the base portion 32 are integrally formed so that production and processing are facilitated, and procedures of assembling the abutting portion 31 to the base portion 32 are decreased. The abutting portion 31 is of a conical structure. In this way, the strength of the abutting portion 31 is increased when the abutting portion 31 and the clamping claw 22 support against each other in a matched manner, and thus the abutting portion 31 is unlikely to be deformed and damaged. Moreover, the abutting portion 31 can be inserted between the inner side of the clamping claw 22 and the lead 0 under a guiding effect. In addition, by means of the second conical guide surface 313, the abutting portion 31 can provide a component force toward an opening direction for the clamping claw 22 when they support each other in the matched manner so that an opening effect of the clamping claw 22 can be further enhanced.

Chamfer 221 is formed on the inner side of the front end of the clamping claw 22. In this way, the abutting portion 31 can be inserted into the clamping claw 22 under a guiding effect, and the opening of the clamping claw 22 is facilitated, so as to prevent the abutting portion 31 from being stuck. Thus, the user experience is further improved.

Figure 5:
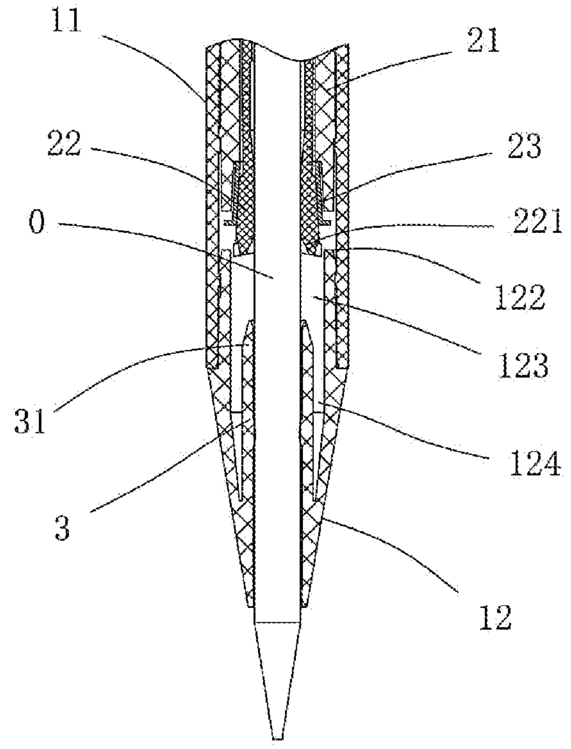
FIG. 5 is a partial view of the structure of a mechanical pencil in embodiment 3 of the present disclosure.
Figure 6:
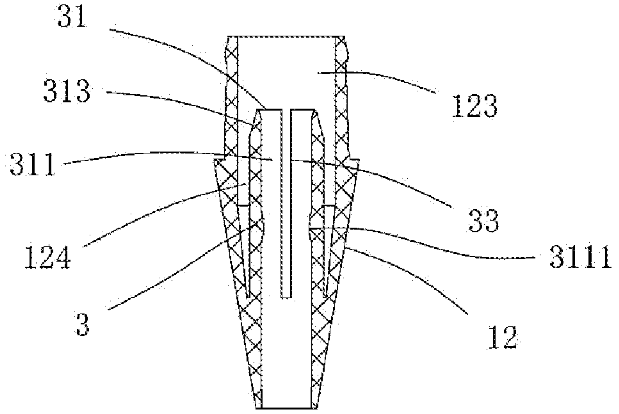
FIG. 6 is a structural view of an end cover of the mechanical pencil in embodiment 3 of the present disclosure.

As shown in FIG. 5 and FIG. 6, a mechanical pencil of the present disclosure in embodiment 3 includes barrel 11 and end cover 12 at the front end of the barrel 11. A lead output mechanism is arranged between the barrel 11 and the end cover 12. The lead output mechanism includes lead output tube 21, clamping claw 22 clamping lead 0 in a matched manner, and sleeve ring 23 movably sleeved outside the clamping claw 22 in a matched manner, where the clamping claw 22 is telescopically arranged at the front end of the lead output tube 21. The rear end of the end cover 12 includes insertion portion 122 inserted into the barrel 11 and positioned on the inner side of the barrel 11. The insertion portion 122 and the sleeve ring 23 coordinate to fulfill the limitation. By means of relative movement of the clamping claw 22 and the sleeve ring 23, the clamping claw 22 opens and releases the lead 0 when moving forward and clamps and fixes the lead 0 again when moving backward.

Abutting member 3 in front of the clamping claw 22 is arranged between the front end of the barrel 11 and the end cover 12 and located in the mechanical pencil. A rear end, corresponding to the clamping claw 22, of the abutting member 3 is provided with abutting portion 31, and the abutting portion 31 includes first through hole 311 allowing the lead 0 to move through. The abutting portion 31 can be inserted into the clamping claw 22 in a case where the clamping claw 22 moves forward, such that bonding portions of the clamping claw 22 and the lead 0 can be separated, and the clamping claw 22 normally opens by means of own elasticity.

Concave hole 123 is formed in the rear end of the end cover 12. The abutting member 3 is arranged at an axial center of the concave hole 123 and is of a cylindrical structure. A front end of the abutting member 3 is integrally connected to the end cover 12. A gap 124 is reserved between the abutting member 3 and the sidewall of the concave hole 123. An outer side of the abutting portion 31 is provided with a second conical guide surface 313, and an outer diameter of the second conical guide surface 313 is gradually increased from the back to the front. A rear end of the abutting member 3 is circumferentially provided with a plurality of slots 33 around the axial center. The abutting member 3 and the end cover 12 are directly integrally formed so that production and processing are facilitated, and the cost can be reduced. The abutting portion 31 is of a conical structure. In this way, the strength of the abutting portion 31 is increased when the abutting portion 31 and the clamping claw 22 support each other in a matched manner, and thus the abutting portion 31 is unlikely to be deformed and damaged. Moreover, the abutting portion 31 can be inserted between the inner side of the clamping claw 22 and the lead 0 under a guiding effect. In addition, by means of the second conical guide surface 313, the abutting portion 31 can provide a component force towards an opening direction for the clamping claw 22 when they support each other in the matched manner so that an opening effect of the clamping claw 22 can be further enhanced.

By means of the slot 33, the abutting member 3 can play an elastic clamping role to a certain extent on the lead 0 penetrating through the first through hole 311, so as to increase the damping of the lead 0 when the lead 0 moves, thus reducing the shaking of the lead 0 during writing and improving a writing effect. The gap 124 provides a space for the abutting member 3 to deform outwards so that the effect of elastic deformation is improved. In order to further improve the damping effect, the inner side of the first through hole 311 is provided with a protrusion 3111.

Chamfer 221 is formed on the inner side of the front end of the clamping claw 22. In this way, the abutting portion 31 can be inserted into the clamping claw 22 under a guiding effect, and the opening of the clamping claw 22 is facilitated, so as to prevent the abutting portion 31 from being stuck. Thus, the user experience is further improved.

Figure 7:
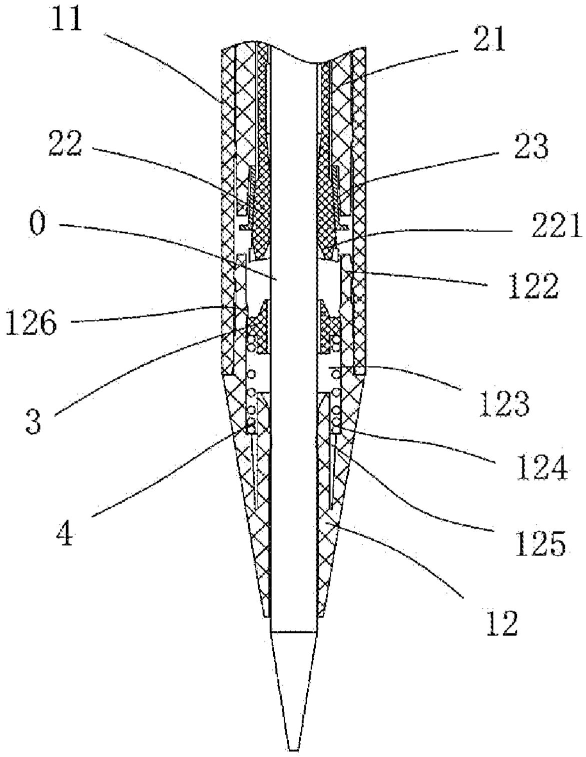
FIG. 7 is a partial view of the structure of a mechanical pencil in embodiment 4 of the present disclosure.
Figure 8:
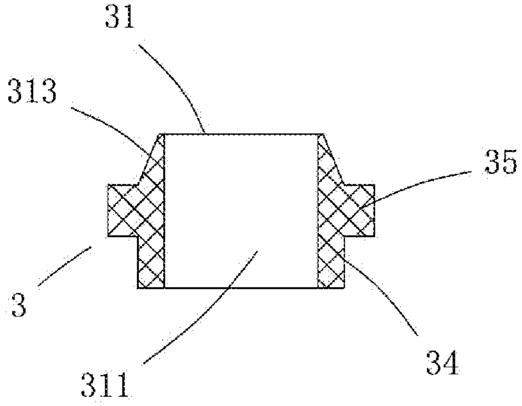
FIG. 8 is a structural view of an abutting member of the mechanical pencil in embodiment 4 of the present disclosure.

As shown in FIG. 7 and FIG. 8, a mechanical pencil of the present disclosure in embodiment 4 includes barrel 11 and end cover 12 at a front end of the barrel 11. A lead output mechanism is arranged between the barrel 11 and the end cover 12. The lead output mechanism includes lead output tube 21, clamping claw 22 clamping lead 0 in a matched manner, and sleeve ring 23 movably sleeved outside the clamping claw 22 in a matched manner, where the clamping claw 22 is telescopically arranged at a front end of the lead output tube 21. The rear end of the end cover 12 includes insertion portion 122 inserted into the barrel 11 and positioned on the inner side of the barrel 11. The insertion portion 122 and the sleeve ring 23 coordinate to fulfill limitation. By means of relative movement of the clamping claw 22 and the sleeve ring 23, the clamping claw 22 opens and releases the lead 0 when moving forward, and clamps and fixes the lead 0 again when moving backward.

Abutting member 3 is arranged in front of the clamping claw 22. A rear end, corresponding to the clamping claw 22, of the abutting member 3 is provided with abutting portion 31, and the abutting portion 31 includes first through hole 311 allowing the lead 0 to move through. The abutting portion 31 can be inserted into the clamping claw 22 in a case where the clamping claw 22 moves forward, such that bonding portions of the clamping claw 22 and the lead 0 can be separated, and the clamping claw 22 normally opens by means of its own elasticity.

An outer side of the abutting portion 31 is provided with second conical guide surface 313, and an outer diameter of the second conical guide surface 313 is gradually increased from the back to the front. The abutting portion 31 is of a conical structure. In this way, the strength of the abutting portion 31 is increased when the abutting portion 31 and the clamping claw 22 support each other in a matched manner, and thus the abutting portion 31 is unlikely to be deformed and damaged. Moreover, the abutting portion 31 can be inserted between the inner side of the clamping claw 22 and the lead 0 under a guiding effect. In addition, by means of the second conical guide surface 313, the abutting portion 31 can provide a component force towards an opening direction for the clamping claw 22 when they support each other in the matched manner so that an opening effect of the clamping claw 22 can be further enhanced.

Chamfer 221 is formed on the inner side of the front end of the clamping claw 22. In this way, the abutting portion 31 can be inserted into the clamping claw 22 under a guiding effect, and the opening of the clamping claw 22 is facilitated to prevent the abutting portion 31 from being stuck. Thus, the user experience is further improved.

The abutting member 3 is arranged between the front end of the barrel 11 and the end cover 12 and located on the inner side of the mechanical pencil. The abutting member 3 is able to move along the mechanical pencil from the front to the back. Spring 4 is arranged at the front end of the abutting member 3 in a contact manner. The front end of the abutting member 3 is provided with sleeving and positioning portion 34 for sleeving and positioning of the spring 4. An intermediate portion of the abutting member 3 is provided with annular flange 35. The rear end of the spring 4 is sleeved outside the sleeving and positioning portion 34 and supports the annular flange 35.

Concave hole 123 is formed in the rear end of the end cover 12. Cylindrical portion 125 is arranged at an axial center of the concave hole 123, and the lead 0 penetrates through the cylindrical portion 125 in a matched manner. Annular gap 124 is reserved between the cylinder portion 125 and a sidewall of the concave hole 123. A front end of the spring 4 is inserted into the gap 124. The abutting member 3 is movably arranged in the concave hole 123 in an axial direction of the mechanical pencil, and the annular flange 35 of the abutting member 3 is in a sliding fit with the inner wall of the concave hole 123. The sidewall of the concave hole 123 is provided with a limiting part 126 capable of limiting the backward movement of the abutting member 3 in coordination with the annular flange 35.

The spring 4 provides an elastic supporting force for the abutting member 3, and the force provided by the spring 4 for the abutting member 3 is gradually increased when the spring 4 is compressed, such that the abutting member 3 and the clamping claw 22 are matched more stably. In this way, the odd feeling is avoided when a tail cover at the rear end of the mechanical pencil is pressed, the lead is output more smoothly, and a pressing force is applied more easily by a hand, so that operation comfort is improved.

Definitely, in other embodiments, the abutting member 3 and the spring 4 may also be arranged in the barrel 11, and the same effect can be achieved.

The above embodiment is just one of the preferred specific embodiments of the present disclosure, and normal variations and substitutions made by those skilled in the art within the scope of the technical solution of the present disclosure shall fall within the protection scope of the present disclosure.

What is claimed is:

1. A mechanical pencil, comprising a clamping claw for playing a coordination role in a lead output; wherein an abutting member is arranged in front of the clamping claw; a rear end, corresponding to the clamping claw, of the abutting member is provided with an abutting portion; the abutting portion comprises a first through hole, wherein the first through hole allows a lead to move through, wherein the abutting member is a separate part, and the abutting member is fixedly mounted to an end cover or a barrel of the mechanical pencil.

2. The mechanical pencil according to claim 1, wherein the abutting member comprises a base portion connected to a barrel or an end cover of the mechanical pencil in a matched manner; the abutting portion is integrally connected to a rear end of the base portion; and an outer side of the abutting portion is provided with a second conical guide surface.

3. The mechanical pencil according to claim 2, wherein a chamfer is formed on an inner side of a front end of the clamping claw.

4. The mechanical pencil according to claim 1, wherein the abutting member comprises an end cover located at a front end of the mechanical pencil; a concave hole is formed in a rear end of the end cover; the abutting member is arranged at an axial center of the concave hole; the abutting member is of a cylindrical structure; a front end of the abutting member is integrally connected to the end cover; a gap is reserved between the abutting member and a sidewall of the concave hole; and an outer side of the abutting portion is provided with a second conical guide surface.

5. The mechanical pencil according to claim 4, wherein a chamfer is formed on an inner side of a front end of the clamping claw.

6. The mechanical pencil according to claim 1, wherein the abutting member is configured to move along the mechanical pencil from front to back, and a spring is arranged at a front end of the abutting member in a contact manner.

7. The mechanical pencil according to claim 6, wherein the mechanical pencil comprises a limiting part configured for limiting a backward movement of the abutting member; and the limiting part is arranged on a barrel or an end cover of the mechanical pencil.

8. The mechanical pencil according to claim 6, wherein a chamfer is formed on an inner side of a front end of the clamping claw.

9. The mechanical pencil according to claim 7, wherein a chamfer is formed on an inner side of a front end of the clamping claw.

10. The mechanical pencil according to claim 1, wherein a chamfer is formed on an inner side of a front end of the clamping claw.

11. A mechanical pencil, comprising a clamping claw for playing a coordination role in a lead output; wherein an abutting member is arranged in front of the clamping claw; a rear end, corresponding to the clamping claw, of the abutting member is provided with an abutting portion; the abutting portion comprises a first through hole, wherein the first through hole allows a lead to move through, wherein the abutting portion is made of a metal and the abutting portion is of a cylindrical structure; the abutting member comprises a base portion connected to a barrel or an end cover of the mechanical pencil in a matched manner; the abutting portion is connected and fixed to a rear end of the base portion in the matched manner; and the base portion is made of a plastic.

12. The mechanical pencil according to claim 11, wherein the base portion comprises a second through hole coaxially communicating with the first through hole in the matched manner; and an annular mounting groove is formed in a rear end of the second through hole, wherein the annular mounting groove is for an insertion and positioning of a front end of the abutting portion.

13. The mechanical pencil according to claim 12, wherein the rear end of the second through hole is provided with a first conical guide surface.

14. The mechanical pencil according to claim 13, wherein a chamfer is formed on an inner side of a front end of the clamping claw.

15. The mechanical pencil according to claim 11, wherein a chamfer is formed on an inner side of a front end of the clamping claw.

16. The mechanical pencil according to claim 12, wherein a chamfer is formed on an inner side of a front end of the clamping claw.

17. A mechanical pencil, comprising a clamping claw for playing a coordination role in a lead output; wherein an abutting member is arranged in front of the clamping claw; a rear end, corresponding to the clamping claw, of the abutting member is provided with an abutting portion; the abutting portion comprises a first through hole, wherein the first through hole allows a lead to move through, wherein a chamfer is formed on an inner side of a front end of the clamping claw.

* * * * *